United States Patent [19]

Haubensak et al.

[11] Patent Number: 6,019,063
[45] Date of Patent: Feb. 1, 2000

[54] LITTER PRODUCT AND PROCESS FOR ITS MANUFACTURE

[75] Inventors: Otto Haubensak, Brannenburg; Werner Huber, Moosburg, both of Germany

[73] Assignee: Gimborn, Inc., Atlanta, Ga.

[21] Appl. No.: 09/040,988

[22] Filed: Mar. 18, 1998

[51] Int. Cl.[7] .................................................. A01K 29/00
[52] U.S. Cl. ............................................................ 119/173
[58] Field of Search ..................................... 119/171, 172, 119/173

[56] References Cited

U.S. PATENT DOCUMENTS

| | | |
|---|---|---|
| Re. 33,983 | 7/1992 | Hughes . |
| 2,279,405 | 4/1942 | Laughlin . |
| 3,735,734 | 5/1973 | Pierce, III . |
| 3,983,842 | 10/1976 | Marion et al. . |
| 4,341,180 | 7/1982 | Cortigene et al. . |
| 4,437,429 | 3/1984 | Goldstein et al. . |
| 4,607,594 | 8/1986 | Thacker . |
| 4,641,605 | 2/1987 | Gordon . |
| 4,657,881 | 4/1987 | Crampton ................................ 119/173 |
| 4,671,208 | 6/1987 | Smith . |
| 5,129,365 | 7/1992 | Hughes . |
| 5,176,107 | 1/1993 | Buscher . |
| 5,188,064 | 2/1993 | House ..................................... 119/173 |
| 5,216,980 | 6/1993 | Kiebke . |
| 5,279,259 | 1/1994 | Rice et al. . |
| 5,303,676 | 4/1994 | Lawson ................................... 119/173 |
| 5,361,719 | 11/1994 | Kiebke . |
| 5,371,054 | 12/1994 | Pluta et al. . |
| 5,386,803 | 2/1995 | Hughes . |
| 5,421,291 | 6/1995 | Lawson et al. ......................... 119/173 |
| 5,452,684 | 9/1995 | Elazier-Davis . |
| 5,503,111 | 4/1996 | Hughes . |
| 5,526,770 | 6/1996 | Kiebke . |
| 5,577,463 | 11/1996 | Elazier-Davis . |
| 5,609,123 | 3/1997 | Luke et al. ............................. 119/173 |

*Primary Examiner*—Thomas Price
*Attorney, Agent, or Firm*—Scott R. Cox

[57] ABSTRACT

A process for the manufacture of a clumpable, highly water absorbent litter product wherein hormite is mixed with sodium smectite clay and a basic reacting alkali metal compound. The mixture is then kneaded, extruded and dried to produce the litter product. Also a clumpable, highly water absorbent litter product which contains as its principal components hormite, sodium smectite and from about 1 to about 3 percent basic reacting alkali metal compound.

39 Claims, No Drawings

LITTER PRODUCT AND PROCESS FOR ITS MANUFACTURE

FIELD OF INVENTION

The invention is directed to a litter product prepared primarily from hormite. In particular, the invention is directed to an improved clumpable litter product prepared from hormite, sodium smectite and a basic reacting alkali metal compound and a process for its manufacture.

BACKGROUND OF INVENTION

Domestic pets, such as cats, are trained to use litter boxes. These litter boxes are often used by pet owners, home owners, veterinarians, etc.

However, conventional litter products used in litter boxes containing conventional clay litter products emit objectionable odors because of the presence of animal dross. In order to reduce or eliminate these objectional odors from conventional clay-based litter products, the pet owner must frequently remove the animal dross from the litter box. However, even frequent removal of the animal dross is not always sufficient to eliminate the source of the odor. When the odor becomes objectionable, it is often necessary to completely remove and replace the litter material contained within the litter box. The litter box is then cleaned and new litter material is placed within the litter box. This removal process is often unpleasant, time consuming and can be expensive if done frequently. Accordingly, new litter products are needed which are inexpensive to produce and economical to use.

The most commonly used litter box products are inexpensive, clay-based products that are safe and non-irritating to the animal and yet, at the same time, can absorb substantial quantities of liquid. Other porous, solid products are also sometimes used as a component of litter products, including straw, sawdust, wood chips, wood shavings, porous polymeric materials, paper, sand, corn husks, and other such organic and inorganic materials. However, use of these products alone often does not eliminate the odor problems associated with conventional litter products.

As a result of this problem, odor suppressing litter products have been produced, such as are disclosed in U.S. Pat. Nos. 4,607,594, 4,641,605 and 3,983,842. U.S. Pat. No. 4,607,594 discloses an animal litter product comprising (1) absorbent particles which may be natural or processed cellulosic materials, synthetic fibers or clay minerals including bentonite, montmorillonite, kaolin, or attapulgite, with attapulgite preferred, (2) inert absorbent granules such as porous polymeric granules, manmade glass or volcanic rock, wherein the absorbent granules are treated with a neutralizing agent selected from the group consisting of a carbonate, bicarbonate, hydrogen phosphate and other neutralizing agents.

U.S. Pat. No. 4,641,605 discloses a litter product comprising a granular litter material sprayed with a sodium or ammonium persulfate and then dusted with a solid buffering agent, wherein the buffering agent is selected from the group consisting of sodium bicarbonate, sodium dihydrogen phosphate, sodium carbonate, potassium dihydrogen phosphate, ammonium dihydrogen phosphate, ammonium sulfate, ammonium chloride and sodium borate. The particular buffering agent is chosen to maintain the pH of the litter product between 6.7 and 7.3. Thus, if a litter product is naturally basic, an acidic buffering agent is utilized to bring the overall pH down to between 6.7 and 7.3.

U.S. Pat. No. 3,983,842 discloses a litter product comprising crushed peanut hulls to which is added a basic odor suppressor such as sodium bicarbonate, calcium carbonate, trisodium phosphate and sodium carbonate. Both of these patents prefer sodium bicarbonate as the odor suppressor. See also U.S. Pat. Nos. 4,341,180, 5,176,107, 5,216,980, 5,303,676, 5,361,719 and 5,526,770.

U.S. Pat. No. 4,657,881 discloses a litter product formed from compacted fines of a non-swelling clay, such as calcium bentonite clay.

In addition to deodorizing the litter products, newer litter products have the ability to clump for easy removal of the animal dross from the litter box. For example, clumping animal litter compositions are described in U.S. Pat. No. 5,000,115, reissued as Re. 33,983. The product disclosed is comprised substantially of a water swellable, sodium bentonite clay product with a particle size within a limited range. The patent requires that particle fines be added to the mixture in a sufficient quantity so that the animal dross agglomerates.

U.S. Pat. No. 5,452,684 discloses a method of agglomerating smectite clay products using litter products, wherein the smectite clay is subject to a shearing process. The smectite clay described in this patent is preferably at least about 50 percent sodium smectite.

U.S. Pat. No. 5,279,259 discloses a clumping animal litter composition comprising particulate attapulgite clay having a moisture content in the range of 10 to 23 percent, free moisture and a particular size distribution of from about 8 to about 40 mesh, preferably 10 to 30 mesh, wherein the animal litter product forms clumps having sufficient strength for separation from unwetted litter.

U.S. Pat. No. 5,577,463 discloses a litter box composition containing an extruded smectite clay, wherein the composition of the litter box product is 100 percent sodium smectite.

U.S. Pat. No. 4,671,208 discloses a litter box composition comprising dried clay and limestone.

U.S. Pat. No. 5,129,365 discloses a litter box composition containing non-compacted particles of a water swellable bentonite clay product and a water absorbent polymer which is added to the clay product to assist in the absorption of animal dross liquids.

U.S. Pat. No. 5,503,111 discloses a litter product comprising at least about 65 percent sodium bentonite, wherein the particles of sodium bentonite are required to be within a specific particle size range. See also U.S. Pat. No. 5,317,990.

U.S. Pat. No. 5,386,803 discloses a litter product containing about 11 to 50 percent sodium bentonite and about 50 to 89 percent calcium bentonite.

Most of these litter products are produced from compositions containing predominantly sodium bentonite because it is a high swelling clay product. In contrast, it has been generally assumed that hormite would not be useful as litter products because hormite is not naturally swellable and does not conventionally clump well.

Litter products produced using fuller's earth or attapulgite clays are disclosed, for example, in U.S. Pat. Nos. 2,279,405, 3,735,734, 4,437,429 5,188,064, 5,371,054 and 5,421,291. However, these products also do not clump well.

Preparation of litter products which contain large quantities of hormite are highly desirable because hormite is inexpensive to mine and prepare for use.

Accordingly, it is an object of this invention to disclose an absorbent litter product containing high concentrations of hormite.

It is a still further object of this invention to disclose an absorbent litter product containing high concentrations of hormite that clumps well.

It is a still further object of this invention to disclose an absorbent litter product containing hormite and a basic reacting alkali metal compound which is highly absorbent.

It is a still further object of this invention to disclose an absorbent litter product containing hormite, sodium smectite and a basic reacting alkali metal compound which is both highly absorbent and agglomerates well.

It is a still further object of this invention to disclose an absorbent litter product containing hormite, a basic reacting alkali metal compound, preferably sodium carbonate, and sodium smectite, wherein the sodium smectite component constitutes less than about thirty (30) percent of the litter product.

It is a still further object of this invention to disclose an absorbent litter product containing high concentrations of hormite which also contains a basic reacting alkali metal compound, preferably sodium carbonate, and preferably sodium smectite, wherein the basic reacting alkali metal compound constitutes at least about 0.1 percent of the composition.

It is a still further object of this invention to disclose a process for the production of an absorbent, clumping litter product containing hormite, a basic reacting alkali metal compound and sodium smectite.

It is a still further object of this invention to disclose a process for the production of an absorbent litter product containing hormite and a basic reacting alkali metal compound.

It is a still further object of this invention to disclose a process for the production of an absorbent litter product containing hormite, a basic reacting alkali metal compound, preferably sodium carbonate, and preferably sodium smectite, wherein the basic reacting alkali metal compound constitutes more than about 0.1 percent of the litter product.

It is a still further object of the invention to disclose a process for the production of an absorbent litter product containing hormite, sodium smectite and a basic reacting alkali metal compound, wherein the components are mixed, kneaded and then extruded through a conventional extruder.

These and other objects of the invention will be disclosed by the detailed description of the invention.

SUMMARY OF INVENTION

The present invention is an absorbent, clumping litter product containing at least about 70 percent hormite by dry weight; less than about 30 percent sodium smectite by dry weight and at least about 0.1 percent by dry weight of a basic reacting alkali metal compound, preferably selected from the group consisting of sodium carbonate, sodium bicarbonate and sodium silicate, most preferably sodium carbonate.

The present invention is also an absorbent litter product, containing principally hormite and at least about 0.1 percent by dry weight of a basic reacting alkali metal compound, preferably selected from the group consisting of sodium carbonate, sodium bicarbonate and sodium silicate, most preferably sodium carbonate.

The present invention is also a process for the production of an absorbent, clumping litter product comprising preparing a hormite clay with a water content less than about 60 percent; adding no more than about 30 percent by weight on a dry weight basis of sodium smectite clay to the hormite to form a mixture; adding at least about 0.1 percent by dry weight of a basic reacting alkali metal compound, preferably selected from the group consisting of sodium carbonate, sodium bicarbonate and sodium silicate, most preferably sodium carbonate; kneading the mixture for a sufficient time to activate the components; extruding the kneaded components; and drying the components to produce the litter product.

The present invention is also a process for the production of an absorbent litter product comprising preparing a hormite with a water content less than about 60 percent; adding at least about 0.1 percent by dry weight of a basic reacting alkali metal compound, preferably selected from the group consisting of sodium carbonate, sodium bicarbonate and sodium silicate, most preferably sodium carbonate to the mixture; kneading the mixture for a sufficient time to activate the components; extruding the kneaded components; and drying the components to produce the litter product.

DETAILED DESCRIPTION OF THE PREFERRED EMBODIMENT

The litter product of the present invention exhibits high water absorption as well as high clump strength. This litter product is produced from clay products which are primarily hormite, which contains major proportions of palygorskite, to which have been added sodium bentonite and a basic reacting alkali metal compound, preferably selected from the group consisting of sodium carbonate, sodium bicarbonate and sodium silicate, most preferably sodium carbonate. Other basic reacting alkali metal compounds include, for example, sodium phosphates, preferably trisodium phosphate, sodium oxalate, sodium acetate and sodium citrate, as well as the corresponding potassium salts.

In an alternative embodiment, the litter product of the present invention exhibits high water absorption and is produced from hormite to which is added a basic reacting alkali metal compound, preferably selected from the group consisting of sodium carbonate, sodium bicarbonate and sodium silicate, most preferably sodium carbonate.

The hormite is a clay mined from the Meigs—Attapulgus—Quincy area of Georgia and Florida, particularly around Meigs, Ga. Conventionally, the term "hormite" has been applied to a wide range of clay materials that have been used as absorbents. However, for purposes of the present invention, the preferred clay is the hormite clay products produced in the region around Meigs, Ga., although other similarly described clay products with high concentrations of hormite are included in the present invention.

This composition of this hormite is primarily palygorskite (or attapulgite) clay. See C. Harvey and H. Murray, "Industrial Clays in the 21st Century: A Perspective of Exploration, Technology and Utilization" applied Clay Science 11, pp. 285–310, particularly pp. 302–306 (1997). In addition, this clay frequently contains small quantities (10 percent or less) of other materials such as kaolinite, quartz, feldspar and mica. In a preferred embodiment, the hormite is composed of palygorskite (or attapulgite) and calcium montmorillonite. The content of the additional components such as kaolinite, quartz, feldspar and mica should not be greater than about ten (10) percent.

The hormite is mined by conventional procedures. The water content of the mined hormite is less than about 60 percent, preferably about 45 to 55 percent. The pH of the hormite as mined is generally at least about 8.0 or higher. After mining, the clay is sent through a conventional crusher, which reduces the size of the clumps to about 2 to 3 inches.

In a preferred embodiment, from about 5 to about 30 percent, and preferably from about 5 to about 20 percent by weight of sodium bentonite is then added to the hormite. (All measures of hormite, sodium bentonite and the basic reacting alkali metal compound are on a dry weight basis.) The sodium bentonite product may be supplied from any number of conventional sources which provide Wyoming-type sodium bentonite or from other sources, or activated sodium bentonite. The sodium bentonite added has a moisture content from about 5 to about 50 percent, and preferably from about 5 to about 20 percent. After the addition of the sodium bentonite to the hormite, the pH of the mixture is generally greater than 8.0, and preferably in the range of about 8.0 to about 9.5.

The mixture of hormite and sodium bentonite is then passed through a conventional secondary crusher which further reduces the size of the clumps of the product to about 1 inch or less. This mixture of hormite and sodium bentonite is then mixed and homogenized, preferably by use of a pug mill, such as a J. C. Steele single shaft pug mill using 40 horsepower.

To this hormite and sodium bentonite mixture is added a small quantity of a basic reacting alkali metal compound to form a preliminary product. The basic reacting alkali metal compound is preferably selected from the group consisting of sodium carbonate, sodium bicarbonate and sodium silicate, with sodium carbonate most preferable. The amount of the basic reacting alkali metal compound added to the mixture is within a range from about 0.1 to about 10 percent, and preferably, from about 1 to about 3 percent. The addition of the basic reacting alkali metal compound to the hormite and sodium bentonite mixture increases the pH of the preliminary product to greater than about 10.0, and preferably from about 10.0 to about 11.5.

In addition to the basic reacting alkali metal compound, "fines" of the litter product, which were produced during the final screening of litter products produced during previous litter producing manufacturing processes, are added to the preliminary product. These fines contain hormite, sodium smectite and the basic reacting alkali metal compound in a ratio approximately equal to the embodiments stated in the present invention. The final composition of the preliminary product contains at least about 60 percent hormite, preferably at least about 70 percent, from about 5 to about 30 percent sodium smectite, preferably about 5 to about 15 percent sodium smectite, and 0.1 to 10 percent, preferably about 1 to 3 percent of the basic reacting metal compound, most preferably sodium carbonate.

The preliminary product containing hormite, sodium bentonite, the basic reacting alkali metal compound and "fines" is then kneaded and extruded using a conventional extruder, such as a GD200 Bedeschi extruder with 250 horsepower. The size of the die opening of the extruder is conventional, preferably from about 10 to about 20 mm.

Once the kneading step has been completed, the kneaded product is dried to reduce its moisture content to about 9 to about 13 percent. It can be dried using conventional drying mechanisms, for example, by placing the mixture in a directly heated rotary drier with a temperature gradient from about 900 °C. to about 100 °C. for about 0.2 to about 2 hours.

A litter product can also be produced that does not contain the sodium bentonite component. This product contains at least about 90 percent hormite and from about 0.1 percent to about 10 percent of a basic reacting alkali metal compound, preferably about 1 percent to about 3 percent. While this product has high water absorbency of at least about 150 percent, preferably at least about 200 percent, it does not exhibit good clumpability. All process steps described above are used in the production of this alternative litter product, except for the addition of the sodium bentonite component.

The pH of the hormite/basic reacting alkali metal compound combination is consistent with the pH of the hormite/sodium bentonite/basic reacting alkali metal compound product, preferably from about 8.0 to about 11.5.

Once the product produced by this process, or these processes, has been thoroughly mixed and dried, it is screened. It is screened to produce litter particles with a size wherein at least about 80 percent of the particles, on a dry weight basis, are between about 1 and 5 mm, preferably up to about 50 percent of the particles are less than 2 mm and from about 20 percent to about 80 percent, preferably at least about 50 percent, are in the range of 2 to 5 mm. In a preferred final product, the size of the particles which are in excess of about 3.35 mm is about 5–30 percent, the size of the particles between about 1.7 and 3.35 mm is about 20 to 60 percent, with about 30–50 percent between about 1.7 mm and 0.8 mm. The particles that are larger than 5 mm are recrushed and reintroduced into the process during the second crushing step. The major portion of the particles which are less than about 0.3 mm are reintroduced into the process as "fines" as previously discussed.

Particles produced by the preferred process using hormite, sodium bentonite and the basic reacting alkali metal compound have a water absorption capacity of about 150 to about 400 percent, preferably from about 200 to about 350 percent. In addition, the particles produced by this process also exhibit good clumpability.

The products produced from the combination of hormite and the basic reacting alkali metal compound without adding sodium smectite have a lower clumpability, but do exhibit good quality water absorption, with a water absorption capacity of at least about 150 percent and preferably above about 200 percent.

EXAMPLES 1–11

In order to test the water absorption and clumpability of the hormite-based litter product, various composition of the products were tested in Examples 1 through 11. In each Example the clay component was obtained from Meigs, Ga. It had a water content of 45 to 55 percent and contained about 60 percent palygorskite, 20 to 40 percent calcium montmorillonite, 0 to 5 percent sepiolite, 0 to 5 percent kaolinite, 3 to 10 percent quartz and 0 to 4 percent accessory products, such as feldspar and mica. Sodium bentonite was obtained from Wyoming and had a water content of 10 to 15 percent. Sodium carbonate was obtained in Georgia from a conventional commercial supplier. The hormite, sodium carbonate, and optionally the sodium bentonite, were kneaded together by use of a J. C. Steele single shaft pug mill at 40 horsepower for 3–10 minutes and then extruded through a Bedeschi extruder GD200 with 250 horsepower through die openings of about 10–20 mm. The product produced was then dried to a water content of 9 to 13 percent and to a particle size wherein up to 50 percent of the particles, by weight, were smaller than 5 mm and 20 to 90 percent were between 2 to 5 mm.

A water absorption test was run on each product. The test procedure is described in Table 1.

A clumpability test was also performed on each product. The test procedure for clumpability is described in Table 2.

Each Example's composition, water absorption and clumpability is shown in Table 3.

It is clear from these Examples that the addition of a basic reacting alkali metal compound, most preferably sodium carbonate, to the hormite and sodium bentonite mixture improves both the water adsorption and the clumpability of the litter product. While the water absorption and clumpability of the hormite improved with the increase in the amount of sodium bentonite added, the increase was not as surprising or significant as was the impact of adding a very small quantity of the basic reacting alkali metal compound to either the hormite and sodium bentonite combination or the hormite alone.

TABLE 1

Water Absorbency Test

I. Purpose

This procedure is used to determine the absorptive capacity of various substances, including processed clay.

II. Reagent:

Water

III. Apparatus:

1. Cone-shaped fine wire (60 mesh) containers.
2. 100 millimeter, 250 millimeter and 500 millimeter burette.
3. Balance (sensitivity 0.1 gram).

IV. Procedure

1. Place 20 grams of sample into cone-shaped container.
2. Immerse container and contents in water for 20 minutes - plus or minus one minute.
3. Withdraw the sample and allow it to drain at room temperature for 20 minutes - plus or minus one minute.

V. Calculations

Water absorption is expressed as percent water retention and is calculated as follows:

$$\frac{\text{(weight of sample plus water)} \text{ minus weight of sample}}{\text{weight of sample}} \text{ times } 100\% = \frac{\text{percent water}}{\text{retention}}$$

TABLE 2

Determination of Litter Clumpability

I. Scope

The procedure is designed to assign a numerical value to the strength of litter product.

II. Reagent: water

III. Apparatus a. Sample splitter.
b. Pan.
c. 100 millimeters burette with stand and clamps.

IV. Procedure a. Fill the pan with the material to be tested.
b. Center pan under the burette with the tip of the burette two inches (2") above the surface of the material.
c. Fill the burette with water.
d. Allow 30 mls. of the water to flow onto the material.
e. Allow the clumps formed by this water to remain undisturbed for fifteen (15) minutes.
f. Remove the clump with a scoop and visually inspect the clump.
g. Assign a numerical value to the clumpability of the wetted material using the following visual criteria:
   1. Clump retains it shape during removal and for at least 24 hours. Scoop remains clean.
   2. Clump may be removed without breaking apart, but particles fall off during removal. Scoop generally remains clean.
   3. Clump breaks apart immediately while trying to be lifted. Scoop may be soiled.

TABLE 3

| Sample Composition | | Water adsorption percent | Measure of clumpability |
|---|---|---|---|
| Example | | | |
| 1. | Hormite | 190 | 3 |
| 2. | Hormite with 5% Na bentonite | 192 | 3 |
| 3. | Hormite with 10% Na bentonite | 203 | 2− |
| 4. | Hormite with 20% Na bentonite | 245 | 2 |
| 5. | Hormite with 25% Na bentonite | 276 | 2+ |
| 6. | Hormite with 2% sodium carbonate | 368 | 2+ |
| 7. | Hormite with 2% sodium carbonate and 5% Na bentonite | 367 | 1 |
| 8. | Hormite with 2% sodium carbonate and 10% Na bentonite | 392 | 1 |
| 9. | Hormite with 2% sodium carbonate and 15% Na bentonite | 358 | 1 |
| 10. | Hormite with 2% sodium carbonate and 20% Na bentonite | 376 | 1 |
| 11. | Hormite with 2% sodium carbonate and 25% Na bentonite | 342 | 1+ |

We claim:

1. A process for forming a water absorbing, clumpable litter product comprising
   (a) preparing a hormite clay product with a moisture content of less than about 60 percent;
   (b) mixing sodium smectite with the hormite to form a mixture such that from about 5 to about 30 percent of the mixture on a dry weight basis is sodium smectite;
   (c) adding at least about 0.1 percent of a basic reacting alkali metal compound, by dry weight, to the mixture to form a preliminary product;
   (d) kneading the preliminary product; and
   (e) drying the preliminary product to produce the water absorbing, clumpable litter product.

2. The process of claim 1 wherein the basic reacting alkali metal compound is selected from the group consisting of sodium carbonate, sodium bicarbonate and sodium silicate.

3. The process of claim 1 wherein the basic reacting alkali metal compound is sodium carbonate.

4. The process of claim 1 wherein at least about 60 percent of the hormite comprises palygorskite clay.

5. The process of claim 1 wherein from about 5 to about 30 percent sodium smectite is mixed with the hormite product.

6. The process of claim 1 wherein from about 0.1 to about 3 percent basic reacting alkali metal compound is added to the preliminary product.

7. The process of claim 1 wherein the preliminary product is treated by kneading the basic reacting alkali metal compound with the mixture of hormite and sodium bentonite for at least about 1 minute.

8. The process of claim 1 wherein the litter product has a pH of at least about 8.0.

9. The water absorbing, clumpable litter product produced by the process of claim 1.

10. A water absorbing, clumpable litter product comprising
    (a) at least about 60 percent hormite, measured on a dry weight basis;
    (b) from about 5 to about 30 percent sodium smectite, measured on a dry weight basis; and
    (c) at least about 0.1 percent of a basic reacting alkali metal compound, measured on a dry weight basis.

11. The litter product of claim 10 wherein the basic reacting alkali metal compound is selected from the group consisting of sodium carbonate, sodium bicarbonate and sodium silicate.

12. The process of claim 10 wherein the basic reacting alkali metal compound is sodium carbonate.

13. The litter product of claim 10 wherein the hormite comprises at least about 60 percent palygorskite clay.

14. The litter product of claim 10 wherein the basic reacting alkali metal compound comprises from about 1 to about 3 percent of the litter product by dry weight.

15. The litter product of claim 10 wherein the sodium smectite comprises from about 5 to about 20 percent of the litter product measured on a dry weight basis.

16. The litter product of claim 10 wherein the product has water absorbency of at least about 150 percent.

17. The litter product of claim 10 wherein the product has water absorbency of from about 200 to about 350 percent.

18. The litter product of claim 10 wherein at least about 80 percent of the litter product by dry weight is in the form of particles with a diameter between about 1 and 5 millimeters.

19. The litter product of claim 10 wherein at least about 50 percent of the litter product by dry weight is in the form of particles with a diameter between about 2 and 5 millimeters.

20. The litter product of claim 10 wherein the product has a pH of at least about 8.0.

21. The litter product of claim 10 wherein the product has a pH from about 10.0 to 10.5.

22. A process for forming a litter product comprising
   (a) preparing a hormite product with a moisture content of less than about 60 percent;
   (b) adding at least about 0.1 percent by dry weight of a basic reacting alkali metal compound to the mixture to form a preliminary product;
   (c) kneading the preliminary product; and
   (d) drying the preliminary product to produce the high water absorbing litter product.

23. The process of claim 22 wherein the basic reacting alkali metal compound is selected from the group consisting of sodium carbonate, sodium bicarbonate and sodium silicate.

24. The process of claim 22 wherein the basic reacting alkali metal compound is sodium carbonate.

25. The process of claim 22 wherein at least about 60 percent of the hormite comprises palygorskite clay.

26. The process of claim 22 wherein the preliminary product is treated by kneading for at least about 1 minute.

27. A high water absorbing, clumpable litter product comprising
   (a) at least about 60 percent hormite measured on a dry weight basis, and
   (b) at least about 0.1 percent of a basic reacting alkali metal compound measured on a dry weight basis.

28. The litter product of claim 27 wherein the hormite comprises at least about 60 percent palygorskite clay.

29. The litter product of claim 27 wherein the basic reacting alkali metal compound comprises from about 1 to about 3 percent of the litter product by dry weight.

30. The litter product of claim 27 wherein the product has a water absorbency of at least about 150 percent.

31. The litter product of claim 27 wherein the pH of the product is at least about 8.0.

32. A litter box comprising a water-impermeable receptacle having disposed therein a water absorbing, clumpable litter product capable of clumping upon wetting, said litter product comprising
   (a) at least about 70 percent hormite;
   (b) from about 5 to about 30 percent sodium smectite; and
   (c) at least about 0.1 percent of a basic reacting alkali metal compound, wherein each component is measured on a dry weight basis.

33. The litter box of claim 32 wherein the basic reacting alkali metal compound is selected from the group consisting of sodium carbonate, sodium bicarbonate and sodium silicate.

34. The litter box of claim 32 wherein the basic reacting alkali metal compound is sodium carbonate.

35. The litter box of claim 32 wherein the basic reacting alkali metal compound comprises from about 1 to about 3 percent of the litter product.

36. The litter product of claim 32 wherein the sodium smectite comprises from about 5 to about 20 percent of the litter product.

37. The litter box of claim 32 wherein the litter product has a water absorbency of at least about 150 percent.

38. The litter box of claim 32 wherein at least about 80 percent of the litter product is in the form of particles with a diameter between about 1 and 5 mm.

39. The litter box of claim 32 wherein the litter product has a pH of at least about 8.0.

* * * * *